United States Patent [19]
Horiuchi et al.

[11] Patent Number: 5,630,445
[45] Date of Patent: May 20, 1997

[54] FUEL TANK FOR AUTOMOTIVE VEHICLES AND EVAPORATIVE EMISSION CONTROL SYSTEM INCORPORATING SAME

[75] Inventors: Masaaki Horiuchi; Takeaki Nakajima; Koichi Hidano; Kazumi Yamazaki; Teruo Wakashiro, all of Wako, Japan

[73] Assignee: Honda Giken Kogyo Kabushiki Kaisha, Tokyo, Japan

[21] Appl. No.: 531,607

[22] Filed: Sep. 21, 1995

[30] Foreign Application Priority Data

Sep. 22, 1994 [JP] Japan .................... 6-254367
Oct. 25, 1994 [JP] Japan .................... 6-260293

[51] Int. Cl.⁶ .................................. F16F 24/00
[52] U.S. Cl. .................... 137/592; 137/587; 137/591; 141/59
[58] Field of Search .................. 123/518; 137/590.5, 137/591, 592, 587; 141/59

[56] References Cited

U.S. PATENT DOCUMENTS

| | | | |
|---|---|---|---|
| 1,979,203 | 10/1934 | Mellon | 137/591 |
| 4,869,283 | 9/1989 | Oeffling et al. | 141/59 |
| 5,014,742 | 5/1991 | Covert et al. | 141/59 |
| 5,215,132 | 6/1993 | Kobayashi | 137/587 |
| 5,327,934 | 7/1994 | Thompson | 141/59 |
| 5,404,906 | 4/1995 | Aoshima et al. | 137/587 |
| 5,431,144 | 7/1995 | Hyodo et al. | 123/520 |
| 5,474,048 | 12/1995 | Yamazaki et al. | 137/587 |

FOREIGN PATENT DOCUMENTS 63-137033  9/1988  Japan .

*Primary Examiner*—A. Michael Chambers
*Attorney, Agent, or Firm*—Nikaido, Marmelstein, Murray & Oram LLP

[57] ABSTRACT

A fuel tank for an automotive vehicle has a tank body for storing fuel. A filler pipe is connected to the tank body. A fuel outlet port device is located within the tank body and connected to an end of the filler pipe. The fuel outlet port device has an outwardly facing fuel outlet opening from which fuel supplied through the filler pipe flows out into the body, and a fuel trap for storing part of the fuel supplied through the filler pipe to thereby prevent evaporative fuel generated within the tank body from flowing into the filler pipe. An evaporative emission control system is also provided, which incorporates the fuel tank.

18 Claims, 16 Drawing Sheets

FUEL TANK FOR AUTOMOTIVE VEHICLES AND EVAPORATIVE EMISSION CONTROL SYSTEM INCORPORATING SAME

BACKGROUND OF THE INVENTION

1. Field of the Invention

This invention relates to a fuel tank for automotive vehicles which is capable of preventing evaporative fuel generated therein from being emitted into the atmosphere during refueling.

2. Prior Art

A fuel tank with a liquid seal device has already been proposed by Japanese Laid-Open Utility Model Publication (Kokai) No. 63-137033, in which a bent filler pipe is employed and the liquid seal device blocks up the filler pipe with fuel (gasoline) supplied through a tank filler port and trapped in a bent portion of the filler pipe to thereby prevent evaporative fuel from being emitted into the atmosphere.

More specifically, the filler pipe has a fuel outlet port device formed of a pipe bent into the shape of a character J and connected to a main body of the filler pipe, whereby fuel is trapped in the fuel outlet port device to prevent evaporative fuel generated within the fuel tank from entering the filler pipe.

Further, the prior art publication discloses a check valve provided in an open end of the filler pipe projecting into the fuel tank for preventing evaporative fuel from being blown out of the tank filler port via the filler pipe.

However, the fuel outlet port device of the prior art fuel tank is prepared by merely bending a filler pipe without modification of the shape of the open end of the filler pipe located within the fuel tank. Consequently, refueling at a high flow rate causes an increase in flow resistance to fuel supplied, which impedes smooth refueling. Moreover, since the fuel outlet port device is formed of a bent portion of the pipe, the filler pipe has to be largely projected into the fuel tank, e.g. as shown in FIG. 1 of the above-mentioned publication, which results in a lower degree of freedom of arrangement of related component parts.

Further, according to the prior art, the open end of the fuel outlet port device is directed toward a float valve provided at an end of an evaporative fuel-guiding pipe opening into the fuel tank. Consequently, fuel flowing into the fuel tank from the fuel outlet port device can impinge on the float valve, thereby causing the same to temporarily close the evaporative fuel-guiding pipe. This causes a temporary rise in pressure within the fuel tank to trigger an auto-stop function of a filler gun to stop refueling before the refueling is completed, thereby impeding smooth refueling.

SUMMARY OF THE INVENTION

It is a first object of the invention to provide a fuel tank for automotive vehicles, which enables smooth refueling while preventing evaporative fuel from being emitted through a filler pipe by the liquid seal effect of fuel supplied.

It is a second object of the invention to provide a fuel tank for automotive vehicles, which has a large degree of freedom of arrangement of related component parts while securing excellent refuelability at a high flow rate.

It is a third object of the invention to provide a fuel tank for automotive vehicles, which is free from adverse action of refueled fuel on the functions of accessory devices attached to an evaporative fuel-guiding passage opening into the fuel tank.

It is a fourth object of the invention to provide an evaporative emission control system, which is capable of preventing evaporative fuel from being emitted through a filler pipe by the liquid seal effect of fuel supplied, and has a large degree of freedom of arrangement of related component parts while securing excellent refuelability at a high flow rate.

To attain the first and second objects, according to a first aspect of the invention, there is provided a fuel tank for an automotive vehicle, comprising:

a tank body for storing fuel;

a filler pipe connected to the tank body; and a fuel outlet port device located within the tank body and connected to an end of the filler pipe, the fuel outlet port device having an upwardly facing fuel outlet opening from which fuel supplied through the filler pipe flows out into the tank body, and a fuel trap for storing part of the fuel supplied through the filler pipe to thereby prevent evaporative fuel generated within the tank body from flowing into the filler pipe.

Preferably, the fuel outlet port device is located within the tank body at an upper portion thereof.

Also preferably, the fuel trap has a bottom wall formed with a small drain hole extending therethrough.

Preferably, the upwardly facing fuel outlet opening has an area which is at least larger than a cross-sectional area of the filler pipe.

Further preferably, the fuel tank includes a check valve provided on the end of the filler pipe connected to the fuel outlet port device, for preventing fuel within the tank body from flowing back into the filler pipe.

Preferably, the filler pipe is generally so gently curved as not to offer significant flow resistance to fuel supplied.

To attain the fourth object, according to a second aspect of the invention, there is provided an evaporative emission control system including a fuel tank, a canister for adsorbing evaporative fuel generated within the fuel tank to temporarily store the evaporative fuel, and at least one evaporative fuel-guiding passage for guiding the evaporative fuel generated within the fuel tank to the canister.

The evaporative emission control system according to the second aspect of the invention is characterized in that the fuel tank comprises:

a tank body for storing fuel;

a filler pipe connected to the tank body; and a fuel outlet port device located within the tank body and connected to an end of the filler pipe, the fuel outlet pork device having an upwardly facing fuel outlet opening, and a fuel trap for storing part of the fuel supplied through the filler pipe to thereby prevent evaporative fuel generated within the tank body from flowing into the filler pipe.

Preferably, the evaporative emission control system includes:

a communication passage communicating between the at least one evaporative fuel-guiding passage and the filler pipe; and a one-way valve arranged in the communication passage, the one-way valve being operable to open when pressure within the tank body becomes higher than pressure within the filler pipe by a predetermined amount, for permitting the evaporative fuel generated within the tank body to be introduced into the filler pipe.

To attain the first and third objects, according to a third aspect of the invention, there is provided a fuel tank for an automotive vehicle, including an evaporative emission control system having a canister for adsorbing evaporative fuel generated within the fuel tank to temporarily store the evaporative fuel, and at least one evaporative fuel-guiding passage for guiding the evaporative fuel generated within the fuel tank to the canister, the fuel tank including:

a tank body for storing fuel, the at least one evaporative fuel-guiding passage being connected to the tank body;

a float valve mounted at an end of the at least one evaporative fuel-guiding passage opening into the tank body, the float valve being located within the tank body at an upper portion thereof;

a filler pipe connected to the tank body; and a fuel outlet port device located within the tank body and connected to the filler pipe, the fuel outlet port device having a fuel outlet opening from which fuel supplied via the filler pipe flows into the body; and a fuel trap for storing part of the fuel supplied through the filler pipe to thereby prevent evaporative fuel generated within the tank body from flowing into the filler pipe.

The fuel tank according to the third aspect of the invention is characterized in that the fuel outlet opening of the fuel outlet port device faces in a direction deviating from the float valve.

Preferably, the fuel outlet port device has an axis thereof laterally deviating from an imaginary vertical plane extending through an axis of the float valve and being parallel to an axis of the tank body, whereby the fuel outlet opening faces obliquely upward in a direction deviating from the float valve.

Alternatively, the fuel outlet opening faces upward, the fuel outlet port device having an axis thereof horizontally laterally deviating from an imaginary vertical plane extending through an axis of the float valve and being parallel to an axis of the tank body, whereby the fuel outlet opening faces in a direction laterally deviating from the float valve.

Further alternatively, the fuel outlet port device has a symmetry plane thereof extending along a longitudinal axis thereof, the symmetry plane being circumferentially inclined relative to an imaginary vertical plane extending through an axis of the float valve and being parallel to an axis of the tank body, whereby the fuel outlet opening faces obliquely upward in a direction deviating from the float valve.

Further preferably, the fuel outlet opening of the fuel outlet port device has an end face inclined in a direction away from the float valve.

More preferably, the fuel outlet opening of the fuel outlet port device has a flow-out guide projecting in a direction away from the float valve.

Preferably, the fuel outlet opening of the fuel outlet port device has an area which is at least larger than a cross-sectional area of the filler pipe.

To attain the first and third objects, there is provided a fuel tank according to a fourth aspect of the invention.

The fuel tank according to the fourth aspect of the invention is characterized by comprising a shield member fixed to an inner surface of the ceiling wall of the tank body at a location between the fuel outlet port device and the float valve.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof.

Figure 1:
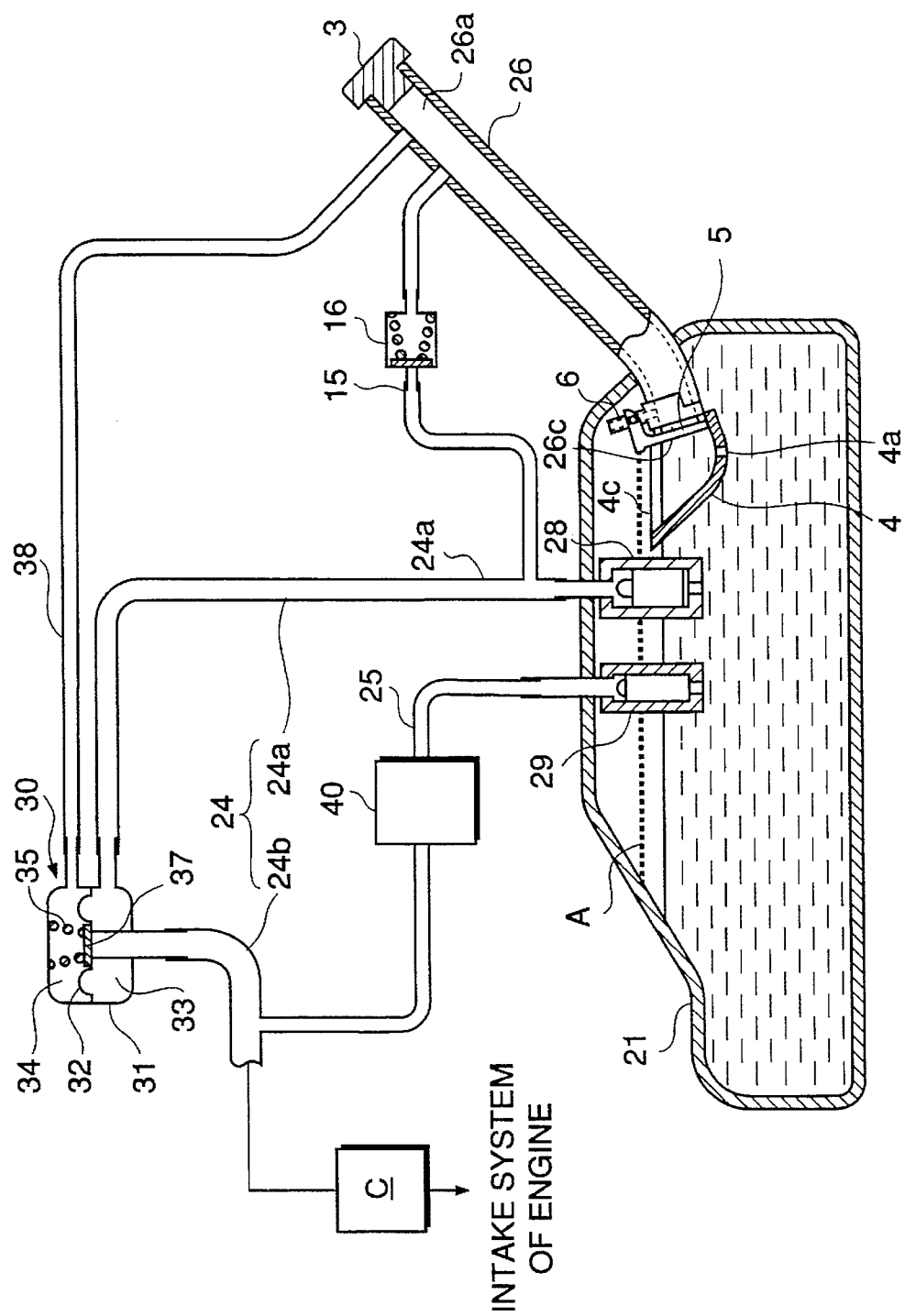
FIG. 1 is a schematic view, partly in section, showing the arrangement of an evaporative emission control system incorporating a fuel tank according to a first embodiment of the invention.

Referring first to FIG. 1, there is shown the arrangement of an evaporative emission control system incorporating a fuel tank according to a first embodiment of the invention.

Figure 2:
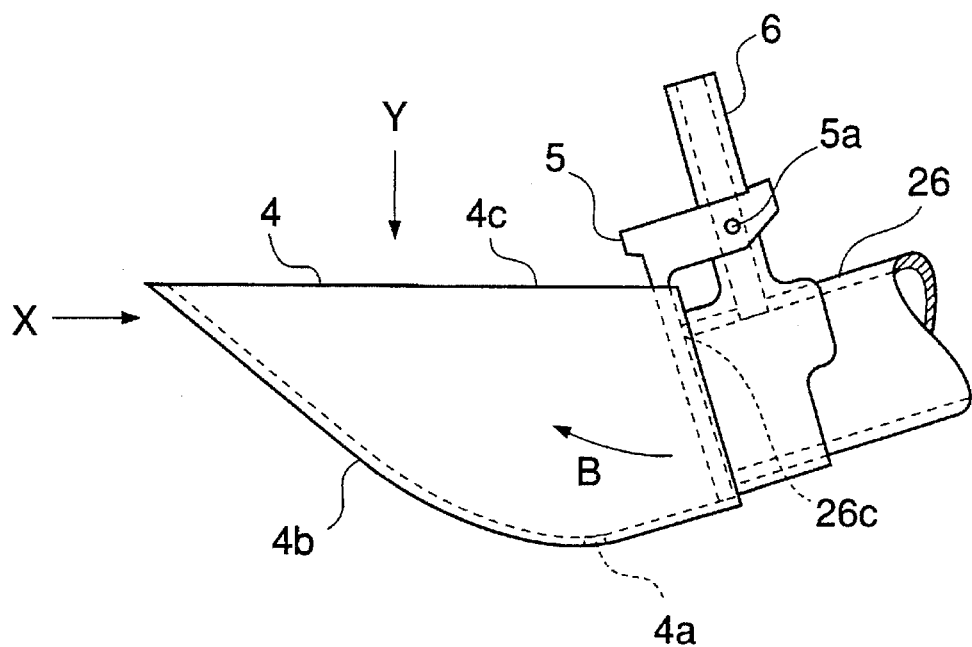
FIG. 2 is an enlarged view of a fuel trap of the fuel tank.

In FIG. 1, reference numeral 21 designates a main body of the fuel tank (hereinafter referred to as "the tank body") to which is connected a filler pipe 26. The filler pipe 26 having a filler tank port 26a removably covered with a filler cap 3 is inserted into the tank body 21 of the fuel tank so that an end portion thereof is located within the tank body 21. The end portion is provided with a fuel trap 4, as a fuel outlet port device, having an upwardly facing fuel outlet opening 4c formed in the top thereof, a check valve 5, and a pressure release pipe 6, as best shown in FIG. 2. The fuel outlet opening 4c of the fuel trap 4 has an area at least larger than the cross-sectional area of the filler pipe 26.

The fuel trap 4 has a bottom wall 4b which is curved substantially in the form of an arc in a longitudinal direction and formed with a small drain hole 4a extending through its lowest portion. The bottom wall 4b is also curved substantially in the form of an arc in a transverse direction i.e., as viewed from the direction of an arrow X in FIG. 2. When viewed from the direction of an arrow Y, the fuel trap 4 is substantially rectangular in outer shape. A pressure release pipe 6 communicates a lower end portion of the filler pipe 26 slightly upstream of the check valve 5 with the interior of the tank body 21, to make the pressure within the filler pipe 26 equal to the pressure within the tank body 21 when the check valve 5 is closed (as shown in FIG. 2). The check valve 5 is pivoted at a shaft 5a to the pressure release pipe 6 for rotation about the shaft 5a. When refueling is not carried out, the check valve 5 is in a closed position closing an open lower end of the filler pipe 26 by its own weight, as shown in the figures. During refueling, the flowing-in fuel forces the check valve 5 to rotate in the direction of an arrow B in FIG. 2 into an open position. The fuel trap 4 and the check valve 5 are formed e.g. of 6-nylon.

The fuel trap 4 is arranged in an upper portion of the fuel tank 21, as shown in FIG. 1, such that an upper peripheral edge portion 26c of the lower end of the filler pipe 26 is not above the surface level of fuel (indicated by the broken line A in FIG. 1) when the tank is fully filled with fuel (i.e. when the auto-stop device of a filler gun G operates to stop refueling). This arrangement of the fuel trap 4 ensures a positive liquid sealing even when refueling is manually carried out after the filler gun G automatically stops its operation.

The fuel tank 21 communicates with a canister C containing an adsorbent, not shown, for adsorbing evaporative fuel generated with the tank body 21 and supplied via a first evaporative fuel-guiding pipe 24. The first evaporative fuel-guiding pipe 24 has a valve 30 arranged therein. The valve 30 has a housing 31 which has its interior divided by a diaphragm 32 having a valving element 37 fixed thereto into a valve chamber 33 and a spring chamber 34. The spring chamber 34 communicates via a communicating pipe 38 with the tank filler port 26a of the filler pipe 26. The spring chamber 34 accommodates a spring 35 urging the valving element 37 in a valve-closing direction. The valve 30 opens when the pressure within the spring chamber 34 drops to the atmospheric pressure or a level in its vicinity when the tank filler cap 3 is removed, and hence it remains closed when refueling is not carried out.

The fuel tank 21 communicates with a portion of the first evaporative fuel-guiding pipe 24 at a location downstream of the valve 30 via a second evaporative fuel-guiding pipe 25. The second evaporative fuel-guiding pipe 25 is smaller in diameter than the first evaporative fuel-guiding pipe 24, and has a two-way valve 40 arranged therein. When refueling is not carried out, the valve 30 remains closed as described above, and evaporative fuel generated within the tank body 21 is supplied to the canister C via the second evaporative fuel-guiding pipe 25. The tow-way valve 40 opens when the pressure within the tank body 21 is higher than the atmospheric pressure by a predetermined amount, or when the same becomes lower than the pressure within the canister C by a predetermined amount.

Further, the filler pipe 26 is connected to the first evaporative fuel-guiding pipe 24 via a passage 15. The passage 15 has a one-way valve 16 arranged thereacross. The one-way valve 16 opens when refueling is carried out at a fairly high flow rate of fuel and a large amount of evaporative fuel is generated within the tank body 21 to increase the pressure within the tank body 21.

Float valves 28, 29 provided at respective ends of the first and second evaporative fuel-guiding pipes 24, 25 opening into the fuel tank 21 are disposed to open when the tank body 21 is filled with fuel to a level indicated by the broken line A in FIG. 1, i.e. fully refueled.

The size of the fuel trap 4 and the maximum opening of the check valve 5 are determined by taking into consideration liquid seal effects, flow resistance to fuel during refueling, and the degree of freedom of arrangement of related component parts.

Next, the operation of the fuel tank of the present embodiment will be described.

When refueling is started, first, fuel supplied fills the fuel trap 4, and then overflows into the tank body 21. The fuel trapped in the fuel trap 4 acts as a liquid seal to prevent evaporative fuel generated within the tank body 21 from being emitted into the atmosphere. The fuel pipe 26 is generally gently curved and does not have any steeply-curved portion which offers significant flow resistance to fuel supplied, and the fuel outlet opening 4c formed in the top of the fuel trap 4 is large in area enough to secure excellent refuelability of the fuel tank even when fuel is refueled at a high flow rate. Further, an overflow of fuel from the fuel trap 4, which has a lower temperature than that of the fuel remaining in the tank body 21, gushes into the tank body 21, whereby the fuel remaining within the tank body 21 is agitated and mixed with the fresh fuel so that the inside of the tank body 21 is cooled, which suppresses generation of evaporative fuel within the tank body 21. Particularly, since the fuel trap 4 is arranged in the upper portion of the tank body 21, the fuel within the tank body 21 is effectively mixed with fresh fuel to cool the inside of the tank body 21.

During refueling, the valve 30 opens so that evaporative fuel generated within the tank body 21 is supplied to the canister C mainly through the valve 30. Further, when the fuel tank is refueled at a high flow rate, air is drawn in through the tank filler port 26a and carried into the tank body 21 together with fuel. In such a case, the pressure of evaporative fuel generated within the tank body 21 increases to cause the one-way valve 16 to open, whereby evaporative fuel is supplied through the passage 15 into the filler pipe 26. This reduces the amount of air to be carried into the tank body 21 by an amount corresponding to the amount of the evaporative fuel introduced into the filler pipe 26 via the passage 15. Further, since fuel is supplied at such a high flow rate, the evaporative fuel introduced into the filler pipe 26 via the passage is returned to the tank body 21 together with fresh fuel poured in via the tank filler port 26a, which prevents the evaporative fuel from being emitted into the atmosphere. On the other hand, when the fuel tank is refueled at a low flow rate, the pressure of evaporative fuel within the tank body 21 does not become high enough to cause the one-way valve 16 to open, so that the evaporative fuel supplied to the passage 15 can never be emitted into the atmosphere.

When the fuel tank is fully filled with fuel, the float valves 28, 29 close, and then the surface level of fuel within the filler pipe 26 increases to such a high level as triggers the auto-stop function of he filler gun G. Accordingly, the pressure within the filler pipe 26 decreases, but then the pressure within the tank body 21 has been increased to such a high level that the check valve 5 is closed by the high pressure within the tank body 21 to prevent fuel from being blown out of the tank filler port 26a.

When refueling is completed and the filler cap 3 is mounted onto the tank filler port 26a, the valve 30 becomes closed, and thereafter evaporative fuel is supplied via the second evaporative fuel-guiding passage 25 to the canister 21. As the fuel within the tank body 21 is consumed, the surface level of the fuel falls so that the amount of fuel trapped within the fuel trap 4 is reduced due to leakage through the small drain hole 4a. When the surface level of the fuel within the tank body 21 becomes lower than the level of the small drain hole 4a, no fuel remains in the fuel trap 4. This reduces the flow resistance of the fuel trap 4 to a flow of fuel supplied on the next occasion of refueling.

Further, the fuel trap 4 can be designed compact in size which affords a large degree of freedom of arrangement of related component parts.

Figure 3:
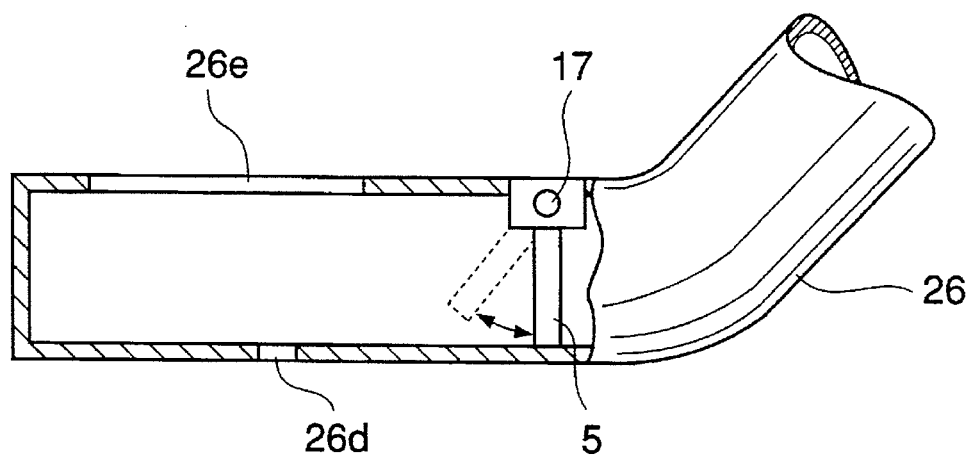
FIG. 3 is a view showing a variation of the fuel trap.

FIG. 3 shows a variation of the first embodiment, in which the fuel trap is formed of an extension of the filler pipe 26. More specifically, the filler pipe 26 is elongated with a lower end thereof closed, but a large opening 26e is formed through the top wall thereof, which has an area larger than the cross-sectional area of the filler pipe 26, and a small drain hole 26d is formed through the bottom wall thereof. In this variation, the check valve 5 is pivotally mounted, for example, on a member 17 fixed to the inner surface of the filler pipe 26.

Figure 4:
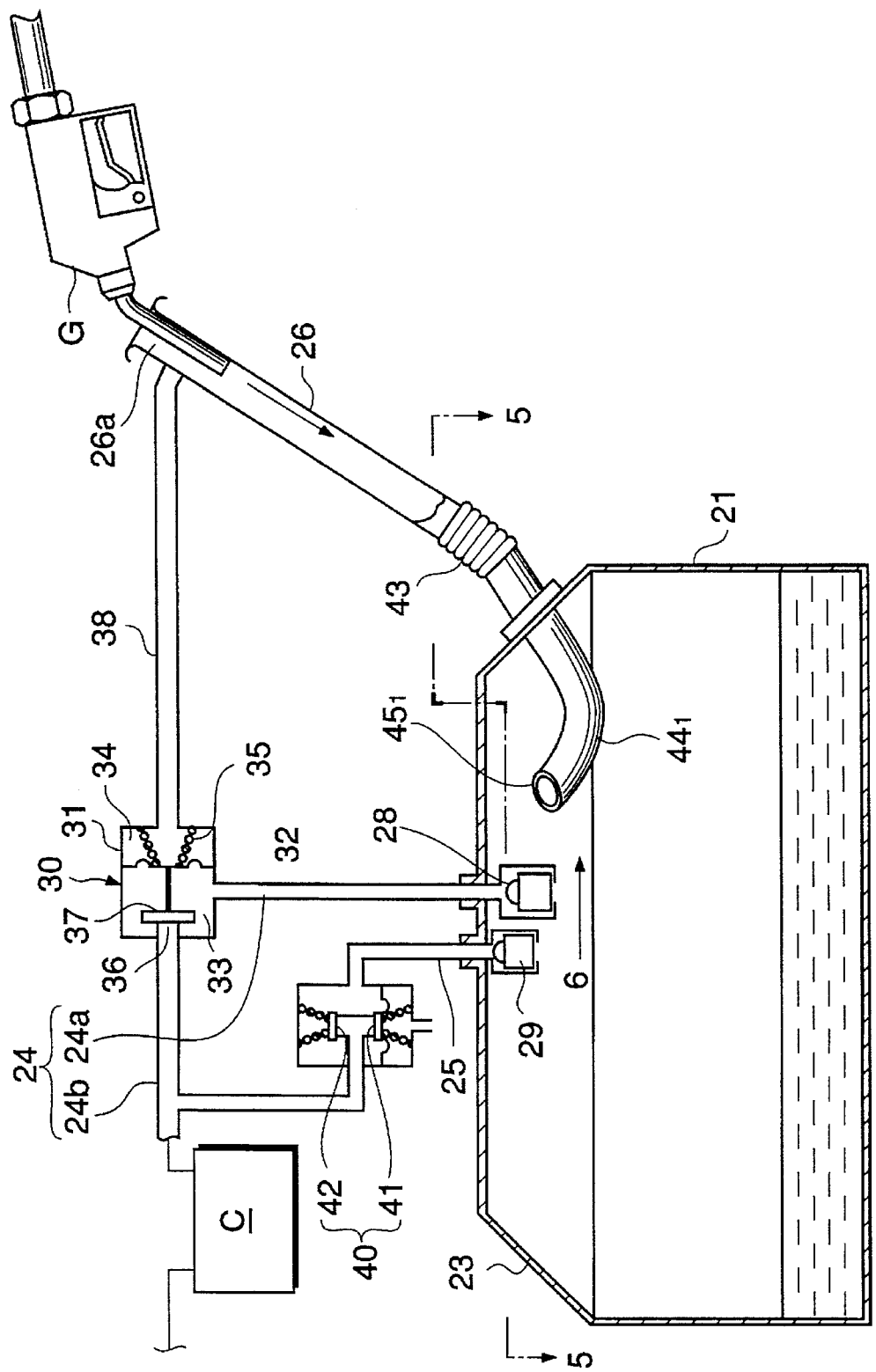
FIG. 4 is a schematic view, partly in section, showing the arrangement of an evaporative emission control system incorporating a fuel tank according to a second embodiment of the invention.
Figure 5:
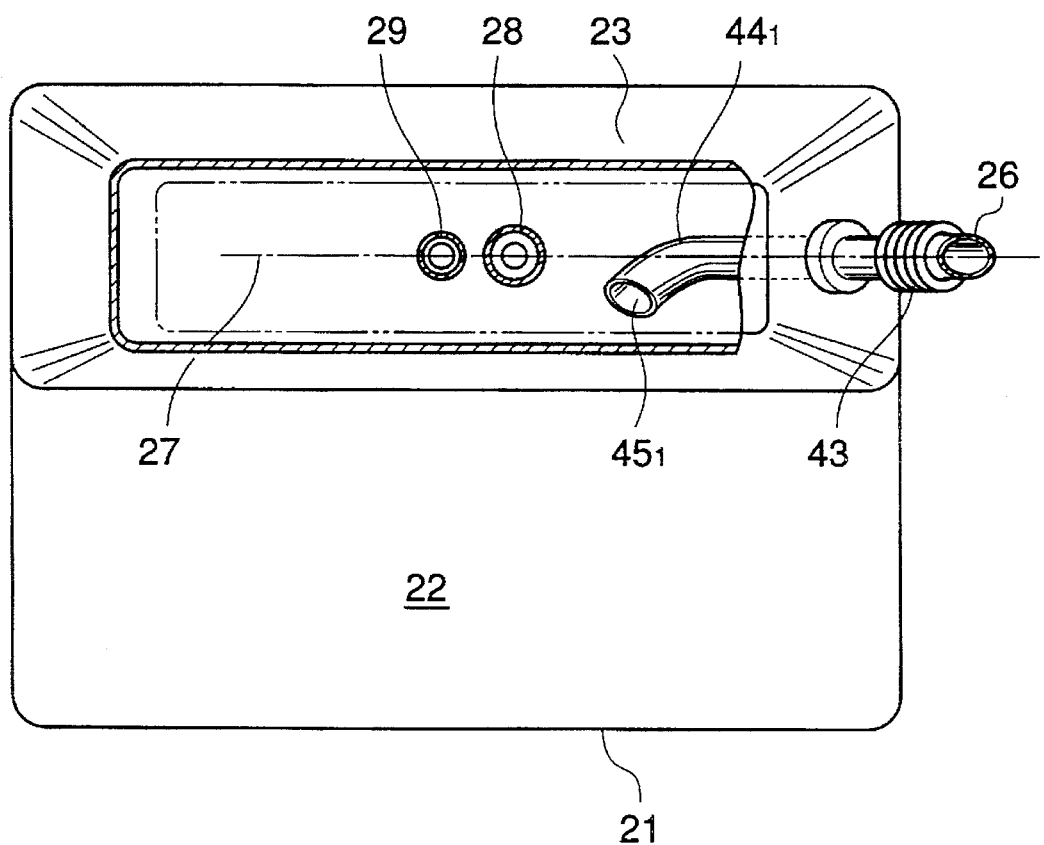
FIG. 5 is a sectional view taken along line 5—5 in FIG. 4.
Figure 6:
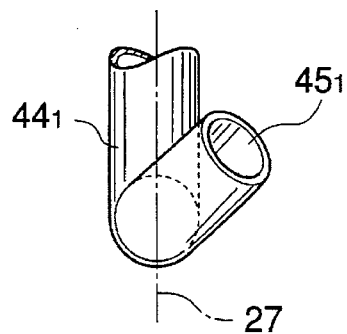
FIG. 6 is an enlarged view taken in the direction of arrow 6 in FIG. 4.

FIGS. 4 to 6 show a fuel tank according to a second embodiment of the invention.

As shown in FIGS. 4 and 5, the fuel tank has the tank body 21 which has a rectangular cross section. The tank body 21 has a top plate 22 mounted on a top thereof. The top plate 22 is formed with a bulging part 23 bulging upward, with a trapezoidal longitudinal section and a rectangular cross section, for example. Inserted into the bulging part 23 of the tank body 21 are lower ends of the first evaporative fuel-guiding pipe 24 and the second evaporative fuel-guiding pipe 25 in a fashion being parallel with each other. The first and second evaporative fuel-guiding pipes 24, 25 extend upward from the bulging part 23 to guide evaporative fuel generated in the fuel tank to an engine, not shown, installed on the automotive vehicle. Further inserted into the bulging part 23 is the filler pipe 26, which is located in an imaginary vertical plane 27 extending through the axes of the float valves 28, 29 and parallel with the longitudinal axis of the tank body 21, and inclined relative to the longitudinal axis of the tank body 21 such that it progressively approaches the first evaporative fuel-guiding pipe 24, toward a lower portion thereof.

The lower ends of the first and second evaporative fuel-guiding pipes 24, 25 are provided with the float valves 28, 29, respectively, which are located within the bulging part 23 such that they close when the surface of fuel within the fuel tank 21 reaches the uppermost level. These float valves 28, 29 open during refueling of the fuel tank via the filler pipe 26.

The first evaporative fuel-guiding passage 24 is connected to the canister C charged with an adsorbent (not shown) for adsorbing evaporative fuel, and has the valve 30 arranged therein, which opens during refueling.

The valve 30 has a housing 31 which has its interior divided by a diaphragm 32 with its periphery being fluid-tightly fixed to the inner surface of the housing 31 into a valve chamber 33 connected to a tank-side part 24a of the first evaporative fuel-guiding pipe 24 and a spring chamber 34 in which is received a spring 35 urging the diaphragm 32 toward the valve chamber 33. Further, the valve chamber 33 accommodates a valving element 37 rigidly connected to the diaphragm 32 for opening and closing a valve hole 36 communicating with a canister-side part 24b of the first evaporative fuel-guiding pipe 24. The spring chamber 34 is communicated via a communicating pipe 38 with the tank filler port 26a of the filler pipe 26 formed at its upper end.

The valve 30 constructed as above operates in the following manner: When the inlet portion 26a of the filler pipe 26 is closed, no differential pressure is developed between the valve chamber 33 and the spring chamber 34 for urging the diaphragm 32 in such a direction that the valving element 37 opens the valve hole 36, and hence the valve 30 remains closed. When the tank filler port 26a is opened and fuel is poured into the tank body 21 by the filler gun G, the pressure within the tank body 21 and hence the pressure within the valve chamber 33 increases to develop differential pressure, so that the diaphragm 32 is displaced in a direction of reducing the volume or capacity of the spring chamber 34, i.e. rightward as viewed from FIG. 1, whereby the valving element 37 opens the valve hole 36. Thus, the valve 30 is open during refueling.

The second evaporative fuel-guiding pipe 25 is also connected to the canister C and has the two-way valve 40 arranged thereacross. The two-way valve 40 is comprised of a positive pressure valve 41 which opens when the pressure within the tank body 21 becomes higher than a predetermined level, thereby establishing communication between the tank body 21 and the canister C, and a negative pressure valve 42 which opens when the pressure within the canister C becomes higher than the pressure within the tank body 21 by a predetermined amount, thereby establishing communication between the tank body 21 and the canister C.

The filler pipe 26 has a lower end portion thereof connected to an open end of a fuel outlet port device $44_1$ via a bellows-like pipe 43. The fuel outlet port device $44_1$ is formed of a cylindrical pipe bent into a J shape and downwardly curved. The fuel outlet port device $44_1$ is fluid-tightly inserted into the tank body 21 through the wall of the bulging part 23 with an open end portion thereof located within the bulging part 23. A fuel outlet opening $45_1$ is formed at the other open end of the fuel outlet port device $44_1$. As best shown in FIG. 3, the other open end of the fuel outlet port device $44_1$ is bent in a lateral and upward direction such that the axis of the other open end of the fuel outlet port device $44_1$ laterally deviates from the imaginary vertical plane 27, with the fuel outlet opening $45_1$ facing obliquely upward in a direction deviating from the float valves 28, 29.

Now, the operation of the fuel tank according to the second embodiment will be described. In refueling, the filler gun G is inserted into the tank filler port 26a of the filler pipe 26 for refueling, and then fuel is poured into the filler pipe 26 through the tank filler port 26a, whereby the fuel flows through the main body of the filler pipe 26, the bellows-like pipe 43, and the fuel outlet port device $44_1$ into the bulging part 23. Since the fuel outlet opening $45_1$ deviates from the float valves 28, 29, the fuel gushing out of the fuel outlet opening $45_1$ is prevented from directly impinging on the float valves 28, 29. As a result, the first evaporative fuel-guiding pipe 24 can never be temporarily closed by a flood of fuel supplied for refueling, which prevents the filler gun G, even if it is provided with an auto-stop function, from stopping the fuel supply before the fuel tank is properly filled with fresh fuel. Thus, smooth refueling of the fuel tank is guaranteed.

Besides, since the fuel outlet port device $44_1$ is generally J-shaped and downwardly curved, fuel is trapped in the device $44_1$ to provide a liquid seal for preventing evaporative fuel generated within the tank body 21 from flowing into the filler pipe 26. As a result, no evaporative fuel is emitted from the filler pipe 26 into the atmosphere during refueling.

Figure 9:
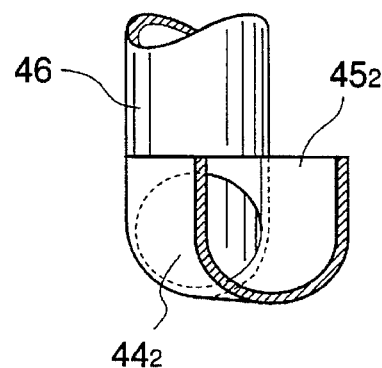
FIG. 9 is an enlarged sectional view taken along line 9—9 in FIG. 7.
Figure 7:
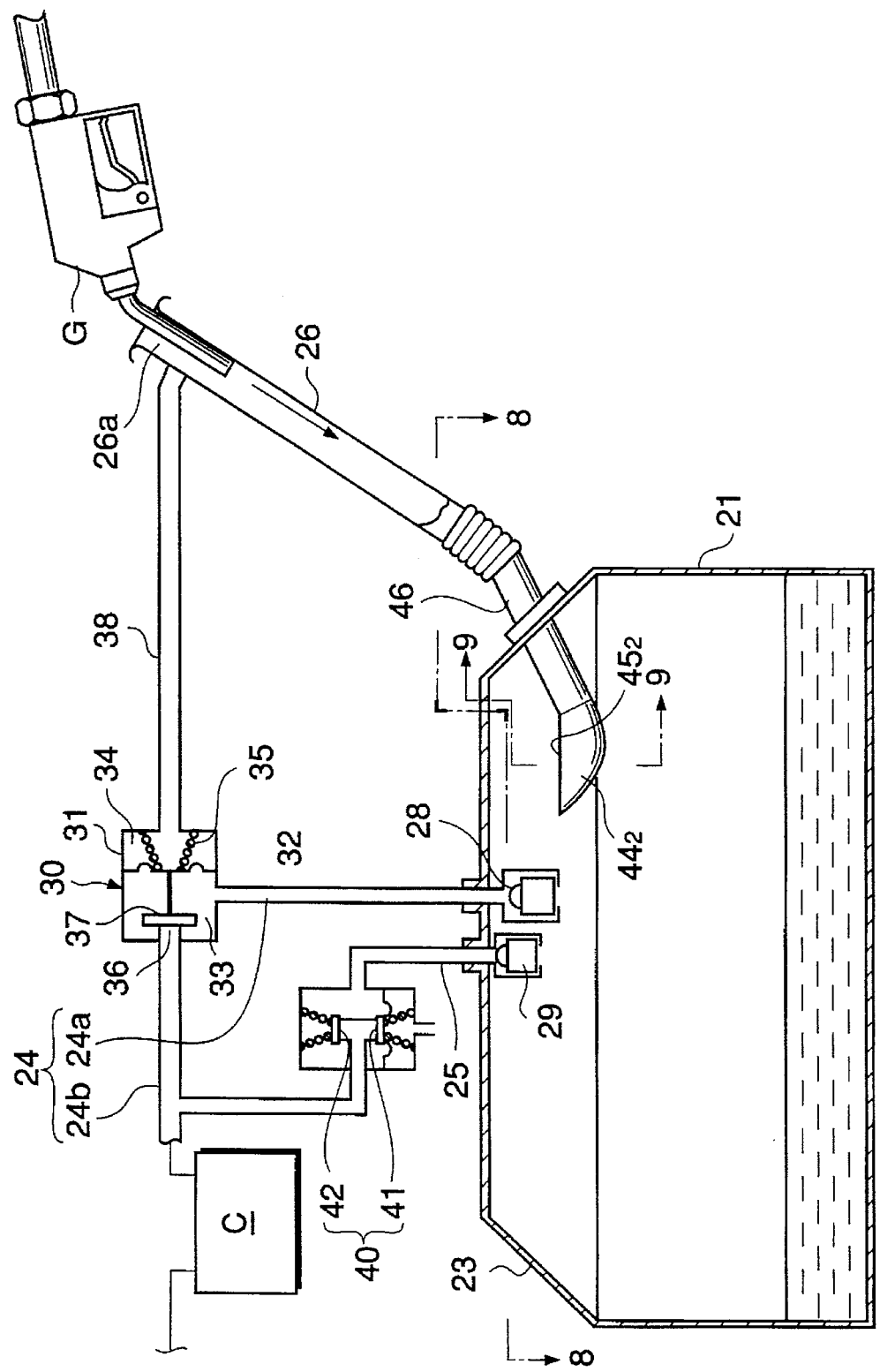
FIG. 7 is a schematic view, partly in section, of a fuel tank according to a third embodiment of the invention.
Figure 8:
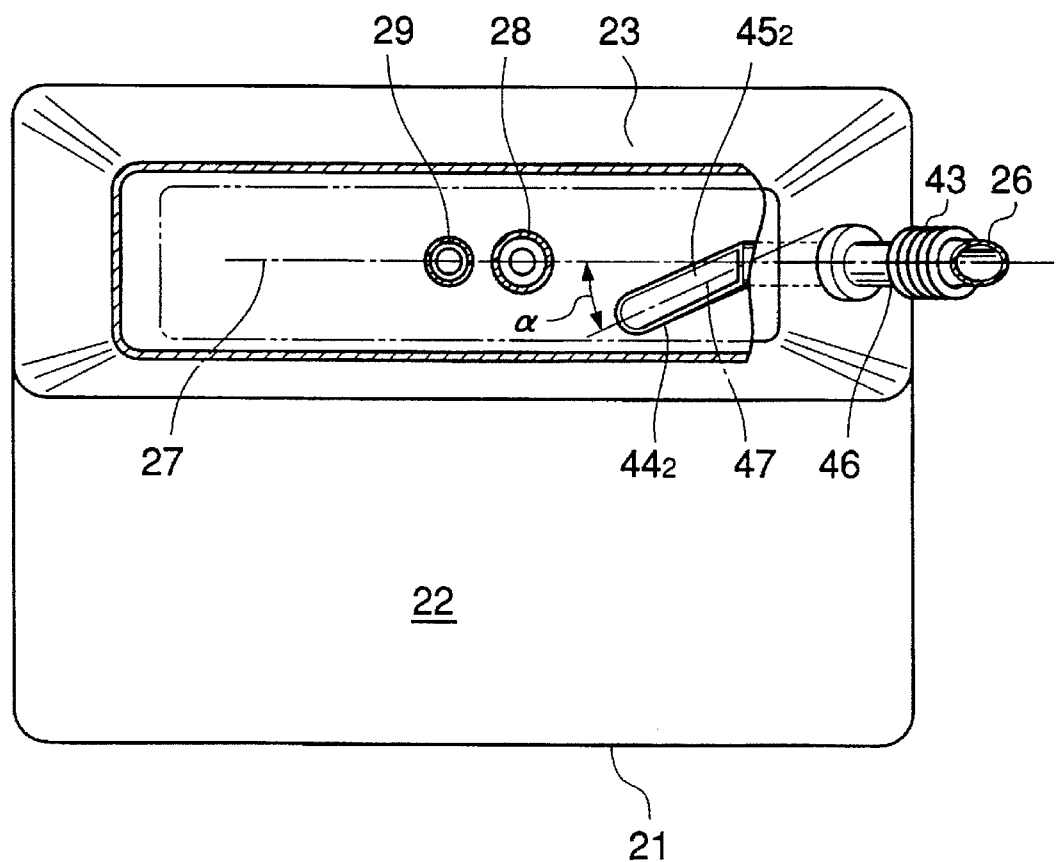
FIG. 8 is a sectional view taken along line 8—8 in FIG. 7.

FIGS. 7 to 9 show a third embodiment of the invention. Elements and parts corresponding to those of the first and second embodiments are designated by identical reference numerals, and detailed description thereof is omitted.

The filler pipe 26 has its lower end connected via the bellows-like pipe 43 to an upper end of a joint pipe 46 fluid-tightly penetrating the wall of the bulging part 23 with its axis extending along the imaginary vertical plane 27. A lower end of the joint pipe 46 located within the bulging part 23 is connected to a fuel outlet port device $44_2$.

The fuel outlet port device $44_2$ has a generally U-shaped cross section with its upper or ceiling wall entirely cut out open and has a bottom wall sloping upward toward the float valve 28. A fuel outlet opening $45_2$ which faces upward is defined by the open upper wall, which is located at a level higher than an upper peripheral edge portion of an open lower end of the joint pipe 46.

The fuel outlet port device $44_2$ is connected to the lower end of the joint pipe 46 such that the longitudinal axis 47 (see FIG. 8) of the device $44_2$ deviates in a horizontal lateral direction from the imaginary vertical plane 27 by an angle $\alpha$, whereby the fuel outlet opening $45_2$ faces in a direction laterally deviating from the float valves 28, 29.

With the arrangement of the third embodiment as well, fuel can be trapped in the fuel outlet port device $44_2$ to provide a liquid seal while fuel can be prevented from directly impinging on the float valves 28, 29, thereby attaining smooth refueling.

Figure 10:
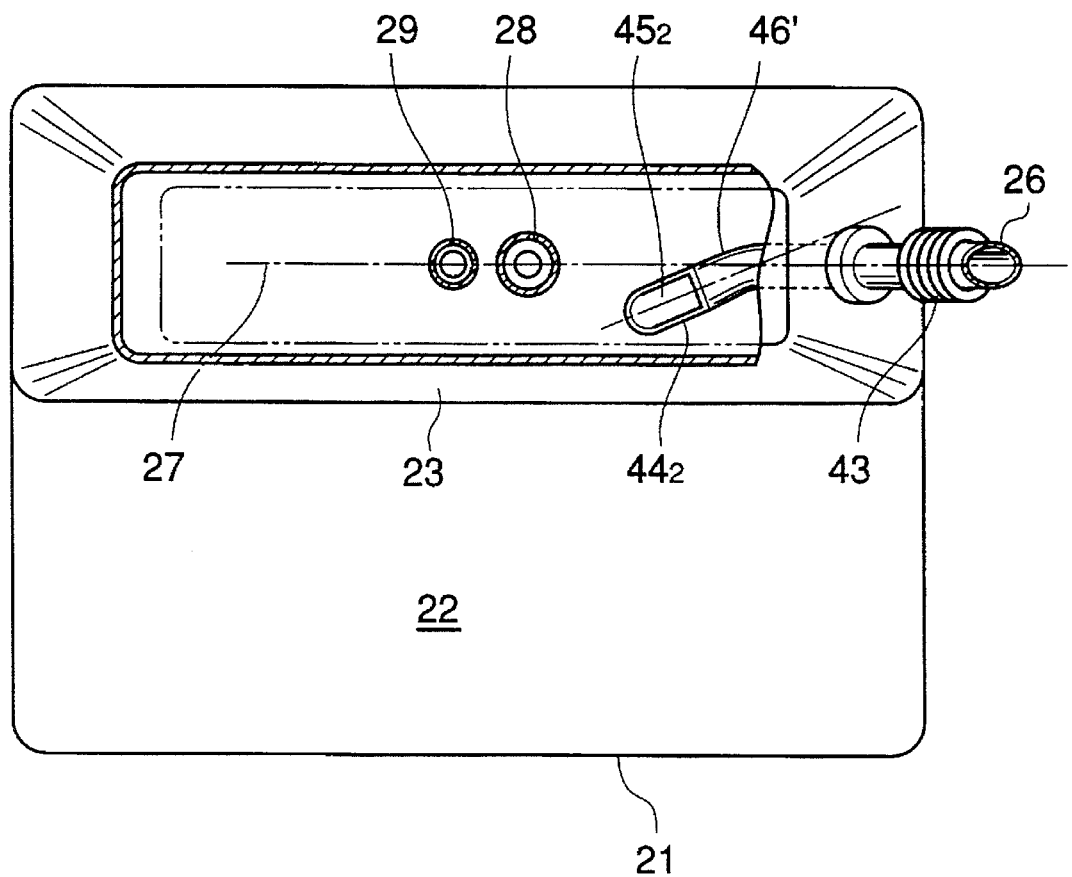
FIG. 10 is a partially cutaway plan view similar to FIG. 8, showing a fuel tank according to a fourth embodiment of the invention.

FIG. 10 shows a fourth embodiment of the invention. In the fourth embodiment a joint pipe 46', which is bent and connected to the fuel outlet port device $44_2$ which has its fuel outlet opening $45_2$ upwardly directed similarly to the third embodiment described above, such that a portion of the pipe 46' within the bulging part 23 deviates in a horizontal lateral direction from the imaginary vertical plane 27 in a fashion becoming more remote from the imaginary vertical plane 27 toward the lower end of the the pipe 46'.

Even with this arrangement, the fuel outlet opening $45_2$ faces in a direction laterally deviated from the float valves 28, 29.

Figure 13:
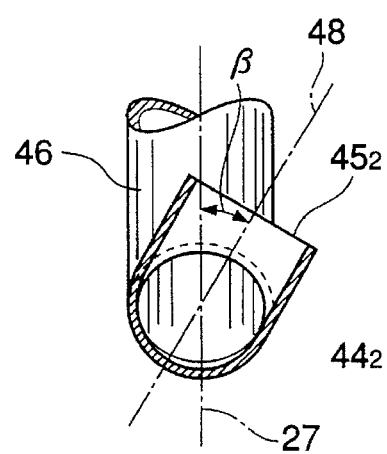
FIG. 13 is an enlarged sectional view taken along line 13—13 in FIG. 11.
Figure 11:
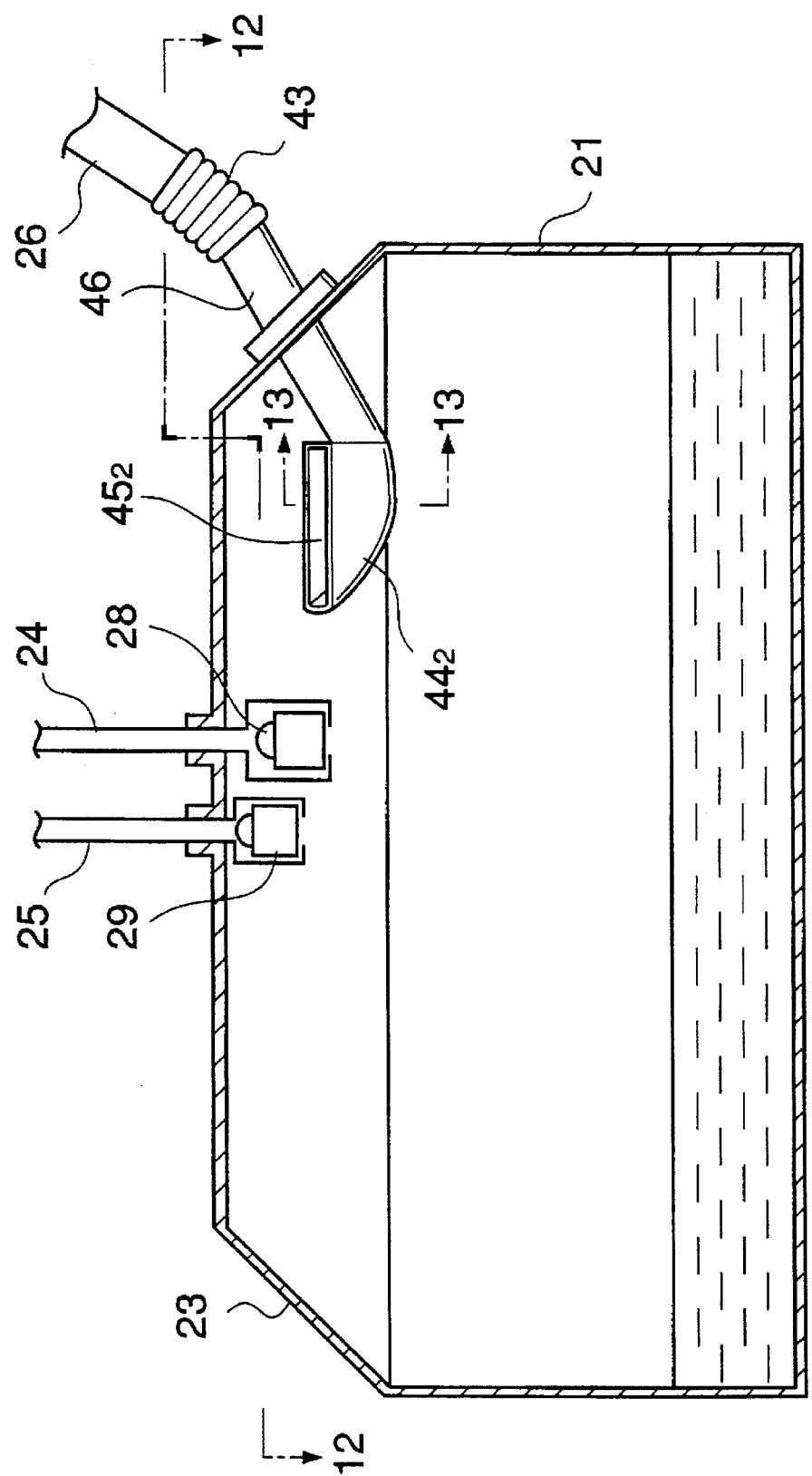
FIG. 11 is a longitudinal sectional view of a fuel tank according to a fifth embodiment of the invention.
Figure 12:
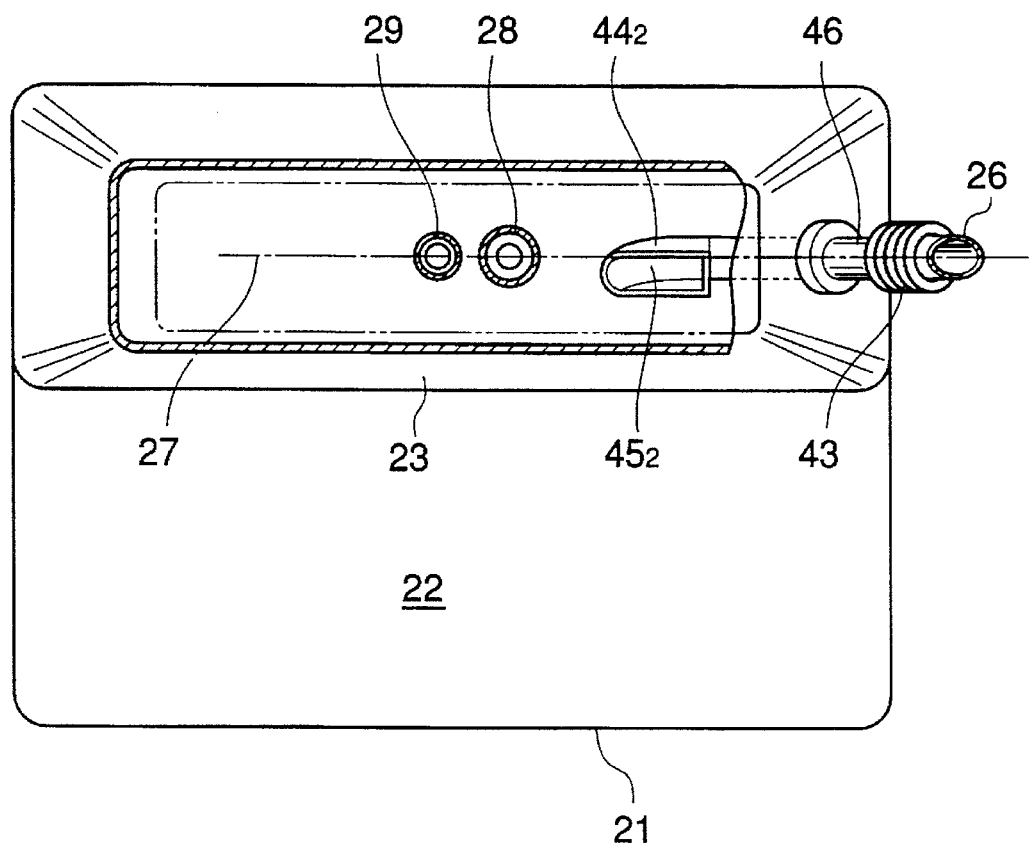
FIG. 12 is a sectional view taken along line 12—12 in FIG. 11.

FIGS. 11, 12 and 13 show a fifth embodiment of the invention. Elements and parts corresponding to those of the above embodiments are designated by identical reference numerals, and detailed description thereof is omitted.

The filler pipe 26 has its lower end connected to the upper end of the joint pipe 46 fluid-tightly penetrating the wall of the bulging part 23 via the bellows-like pipe 43 with the axis of the joint pipe 46 being located along the imaginary vertical plane 27. The fuel outlet port device $44_2$ is connected to the lower end of the joint pipe 46 located within the bulging part 23 such that the former is inclined relative to the latter in a circumferential direction, in other words, a symmetry plane 48 (see FIG. 13) of the fuel outlet port device $44_2$ extending along the longitudinal axis thereof forms an angle $\beta$ with the imaginary vertical plane 27 extending through the axes of the float valves 28, 29 in the circumferential direction, whereby the fuel outlet opening $45_2$ faces obliquely upward in a direction deviating from the float valves 28, 29.

Figure 14:
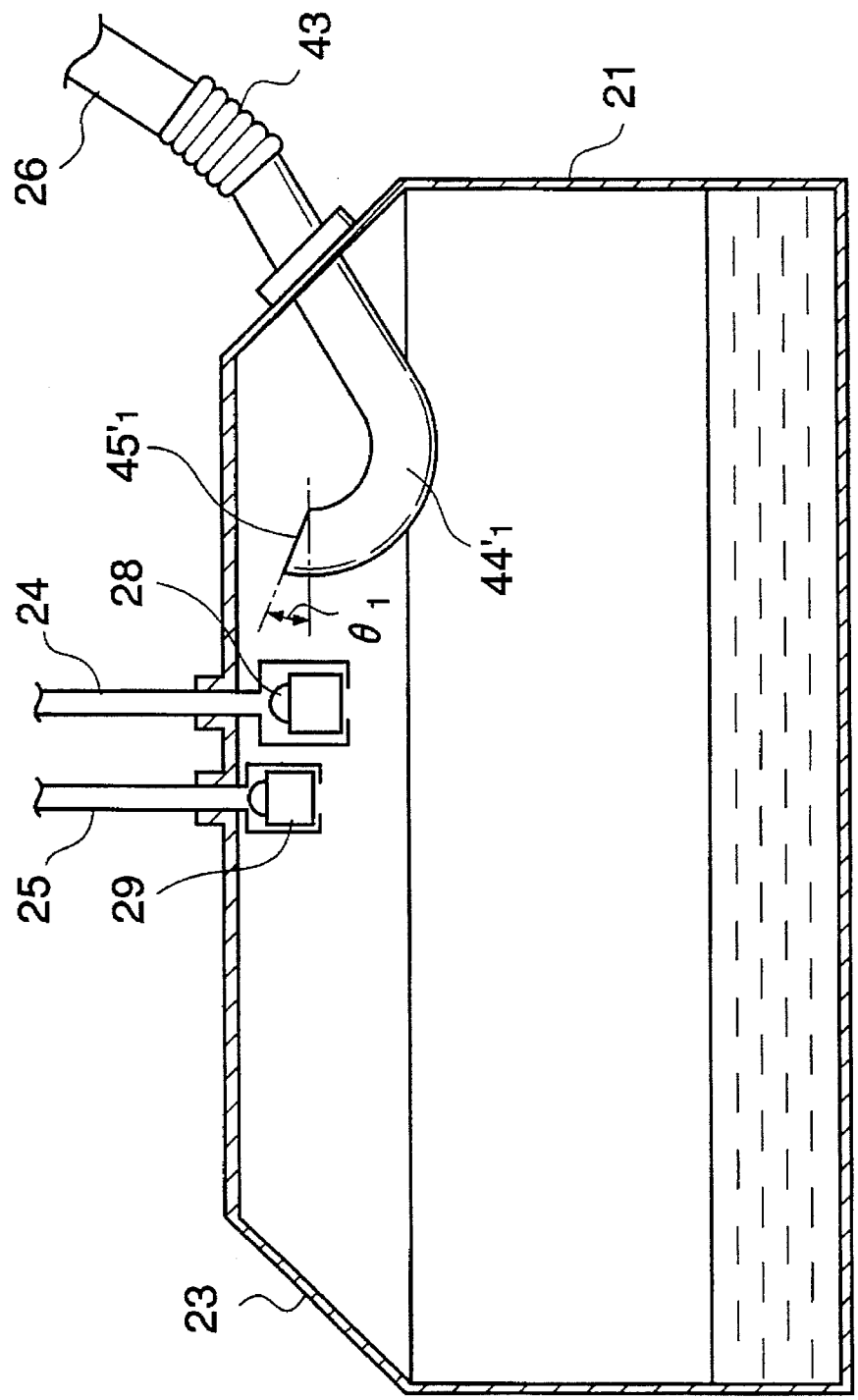
FIG. 14 is a longitudinal sectional view of a fuel tank according to a sixth embodiment of the invention.

FIG. 14 shows a sixth embodiment of the invention, in which a fuel outlet port device $44_1'$ is provided, which is basically identical in construction and arrangement with the fuel outlet port device $44_1$ of the second embodiment, but is distinguished from the latter in that the J-shaped fuel outlet port device $44_1'$ has an upwardly facing fuel outlet opening $45_1'$ arranged in the bulging part 23, which has an end face thereof longitudinally inclined in a direction away from the float value 28 so as to form an angle $\theta_1$ with an imaginary horizontal plane.

Figure 15:
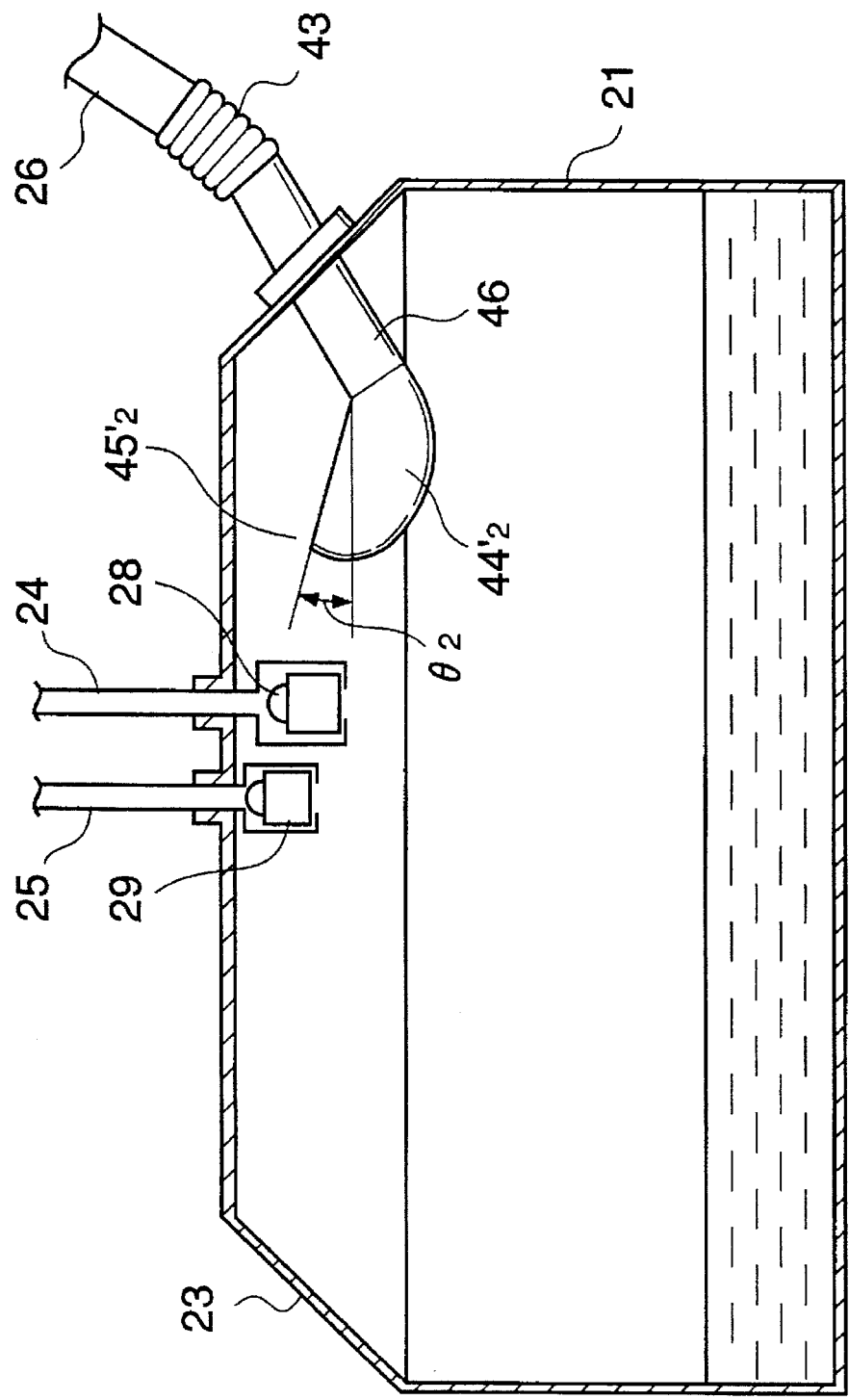
FIG. 15 is a longitudinal sectional view of a fuel tank according to a seventh embodiment of the invention.

FIG. 15 shows a seventh embodiment of the invention, in which a fuel outlet port device $44_2'$ is provided, which is basically identical in construction and arrangement with the fuel outlet port device $44_2$ of the third to fifth embodiments, but is distinguished from the latter in that the fuel outlet port device $44_2'$ has an upwardly facing fuel outlet opening $45_2'$ arranged in the bulging part 23, which has an end face thereof longitudinally inclined in a direction away from the float valve 28 so as to form an angle $\theta_2$ with an imaginary horizontal plane.

Figure 16:
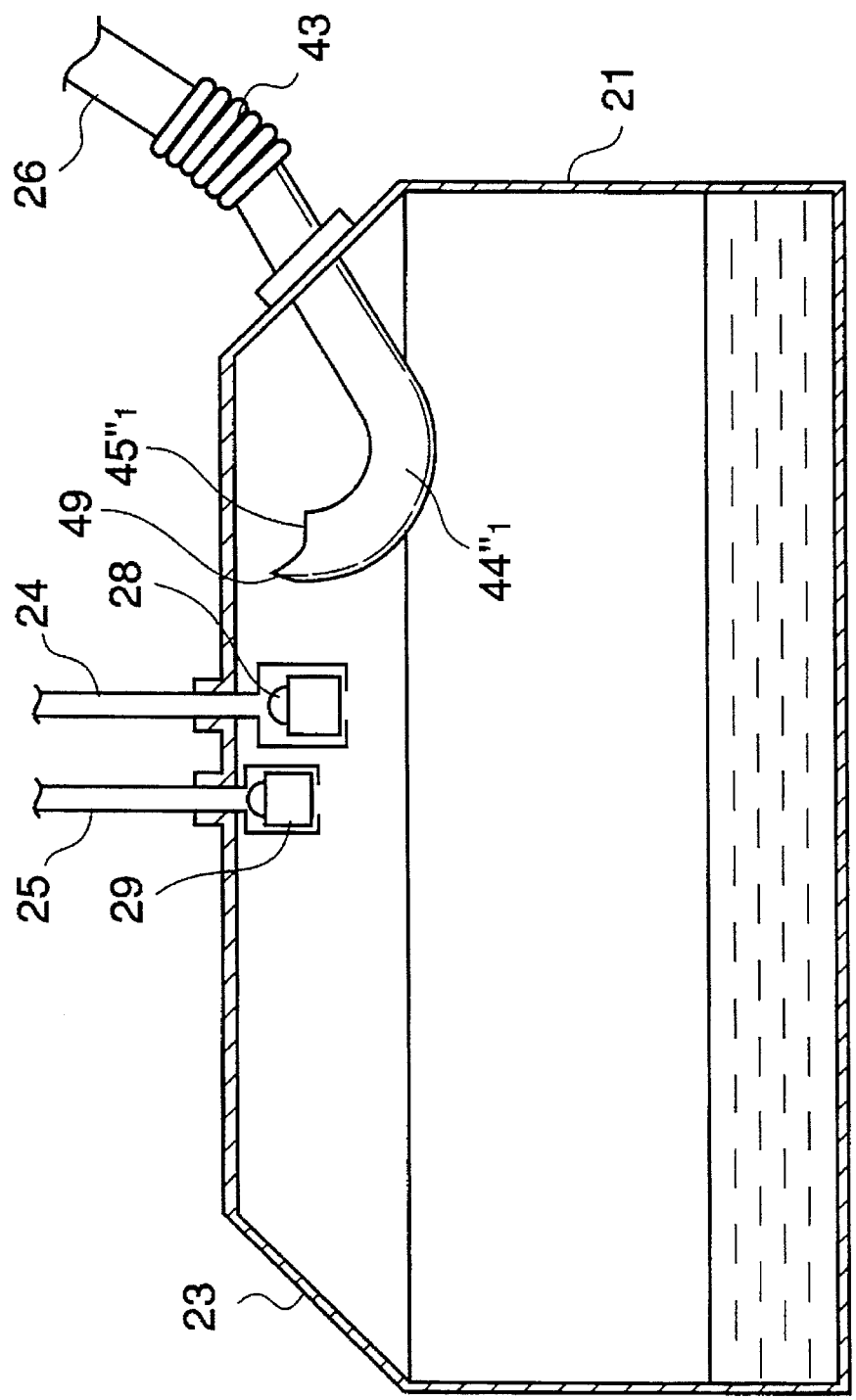
FIG. 16 is a longitudinal sectional view of a fuel tank according to an eighth embodiment of the invention.

FIG. 16 shows an eighth embodiment of the invention, in which a fuel outlet port device $44_1''$ is provided, which is basically identical in construction and arrangement with the fuel outlet port device 44 of the second embodiment, but is distinguished from the latter in that the fuel outlet port device $44_1''$ has an upwardly facing fuel outlet opening $45_1''$ at its open end, which has an end face thereof longitudinally inclined in a direction away from the float valve 28 and downwardly curved, forming a flow-out guide 49 which projects away from the float valve 28 so as to guide fuel gushing out of the fuel outlet opening $45_1''$ in a direction away from the float valve 28.

Figure 17:
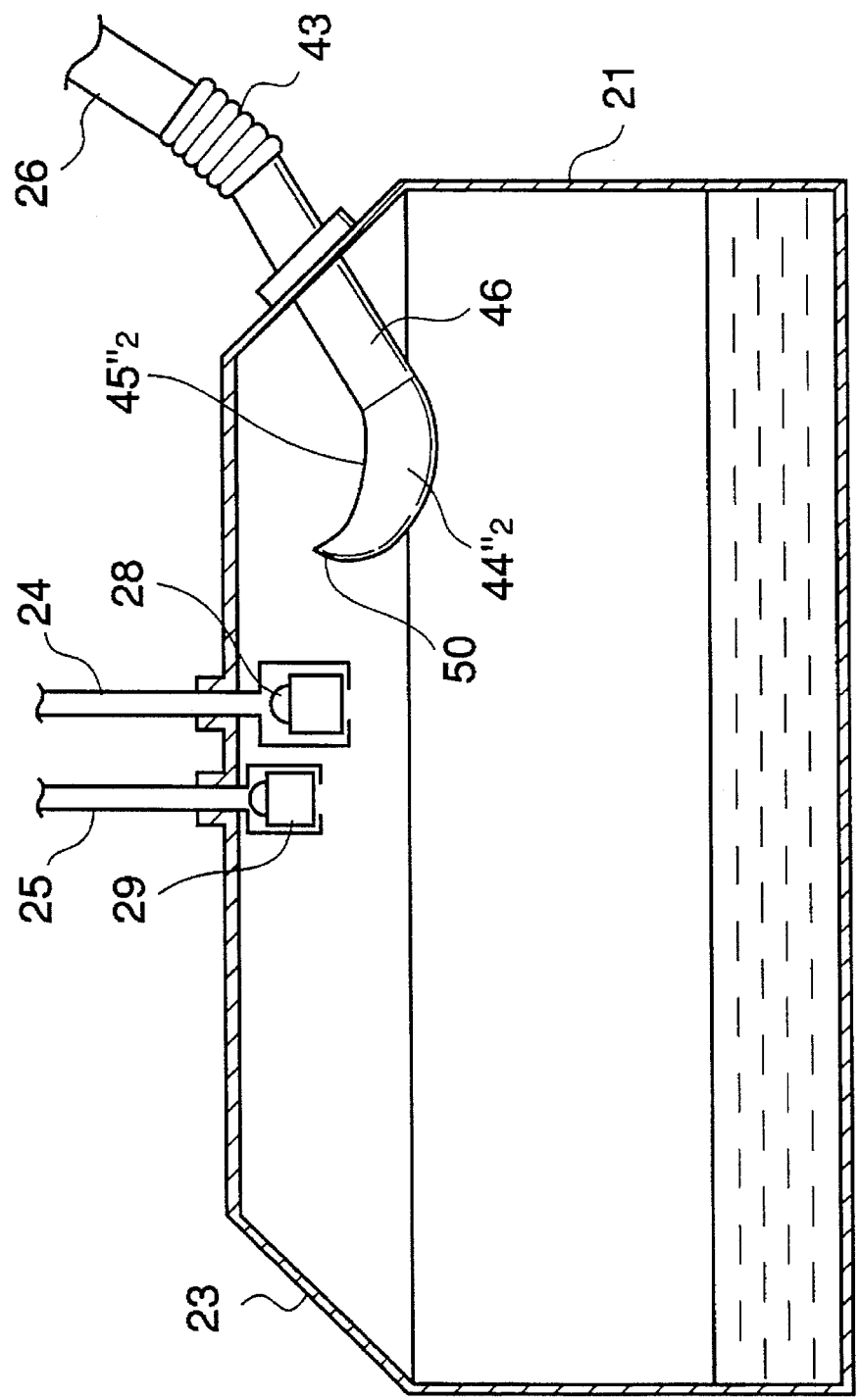
FIG. 17 is a longitudinal sectional view of a fuel tank according to a ninth embodiment of the invention.

FIG. 17 shows a ninth embodiment of the invention, in which a fuel outlet port device $44_2''$ is provided, which is basically identical in construction and arrangement with the fuel outlet opening $44_2$ of the third to fifth embodiments, but is distinguished from the latter in that the fuel outlet port device $44_2''$ has an upwardly facing fuel outlet opening $45_2''$ arranged in the bulging part 23, which has an end face thereof longitudinally inclined in a direction away from the float value 28 and downwardly curved, forming a flow-out guide 50 which projects away from the float valve 28 so as to guide fuel gushing out of the fuel outlet opening $45_2''$ in a direction away from the float valve 28.

Even with the arrangements of the fourth to ninth embodiments described above, fuel can be trapped in the fuel outlet port device to provide a liquid seal while fuel is prevented from directly impinging on the float valves 28, 29, thereby securing smooth refueling.

Figure 18:
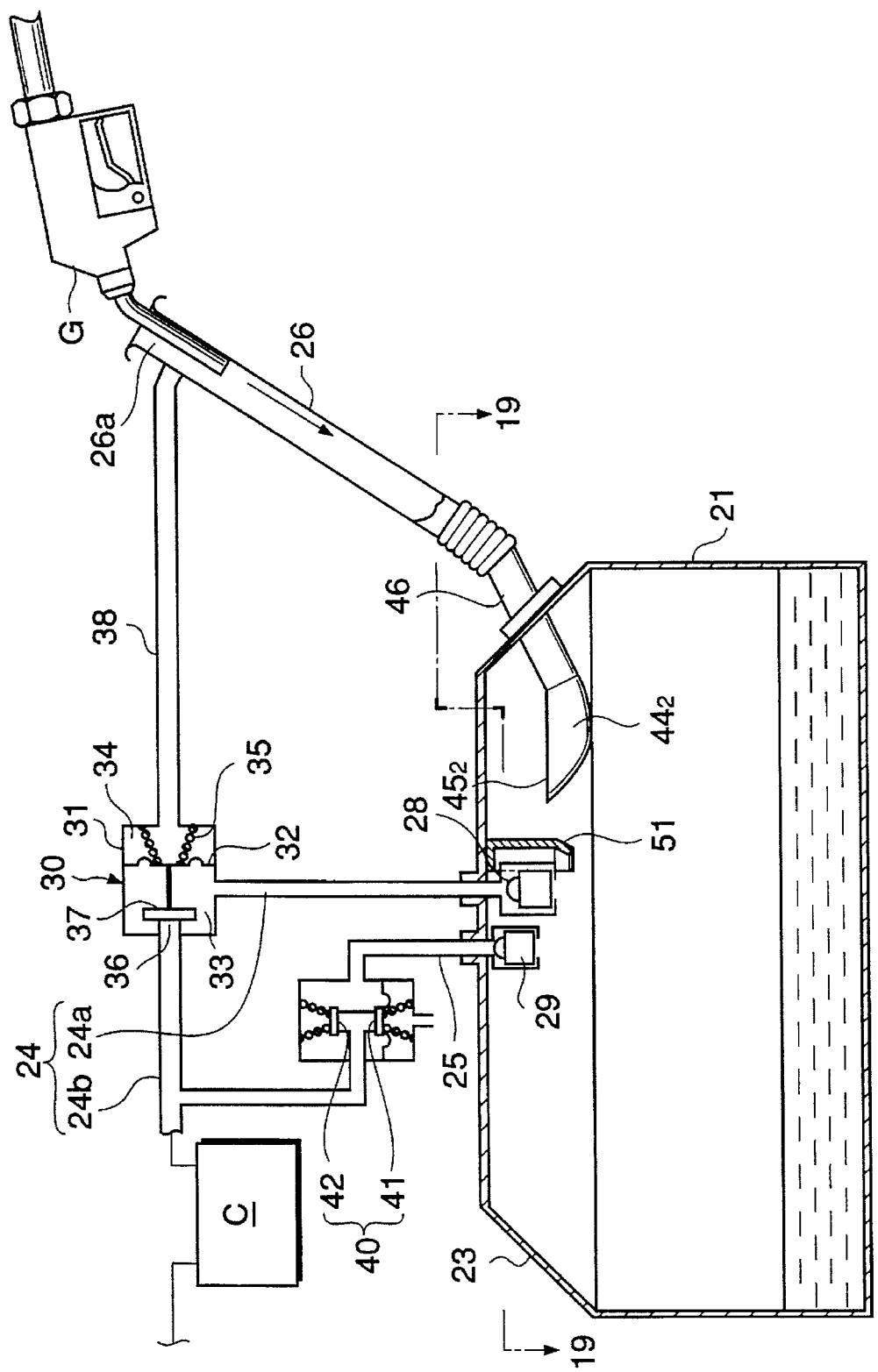
FIG. 18 is a longitudinal sectional view of a fuel tank according to a tenth embodiment of the invention.
Figure 19:
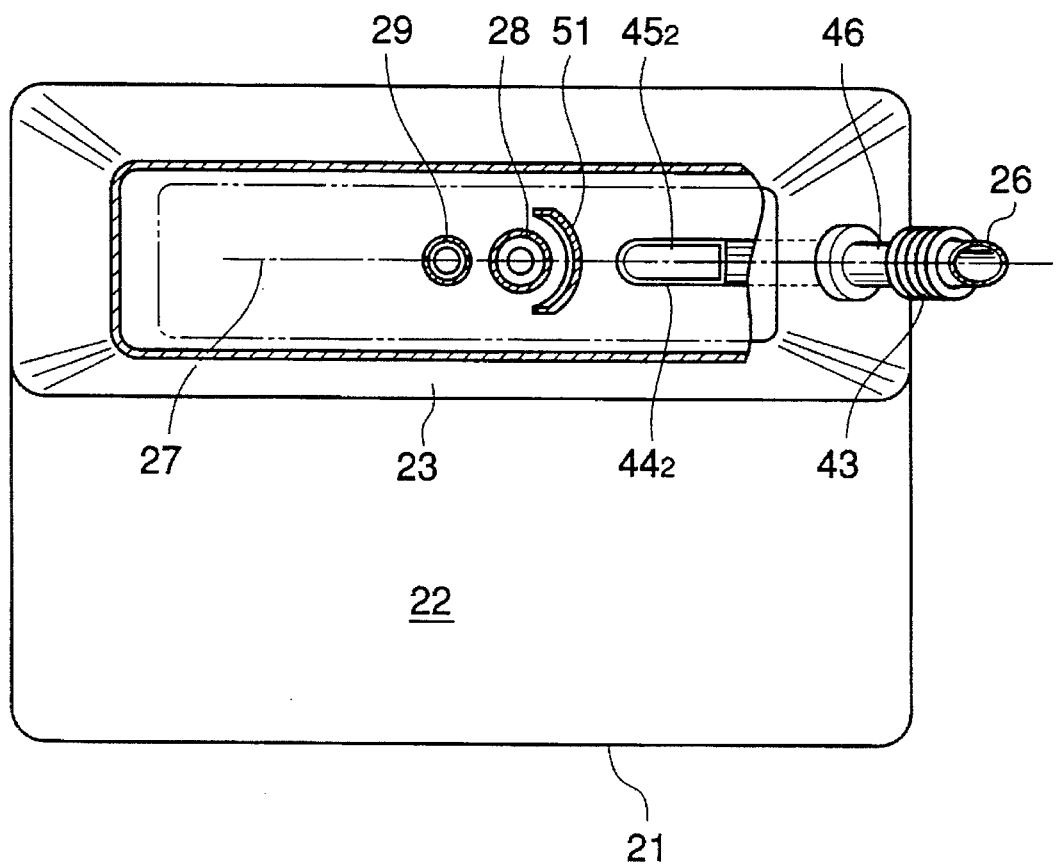
FIG. 19 is a sectional view taken along line 19—19 in FIG. 18.

FIGS. 18 and 19 show a tenth embodiment of the invention. Elements and parts corresponding to those of the above embodiments are designated by identical reference numerals, and detailed description thereof is omitted.

The fuel outlet port device $44_2$ connected to the lower end of the joint pipe 46 extending into the bulging part 23 is disposed with its longitudinal axis in alignment with the imaginary vertical plane 27 extending through the axes of the float valves 28, 29. The upwardly facing fuel outlet opening $45_2$ is formed in the top of the device $44_2$, similarly to the second embodiment, etc. Further, a shield plate 51, which is arcuate in cross section, is provided in the bulging part 23. The shield plate 51 is rigidly fixed to an inner surface of the ceiling wall of the bulging part 23 at a location between the float valve 28 and the fuel outlet port device $44_2$ in a fashion partly surrounding the float valve 28.

According to the tenth embodiment, the fuel outlet opening $45_2$ of the fuel outlet port device $44_2$ faces toward the float valve 28. However, the shield plate 51 prevents fuel gushing out of the fuel outlet opening $45_2$ from directly impinging on the float valve 28, to thereby prevent refueling from adversely affecting the functions of the evaporative fuel-guiding pipes 24, 25, particularly the float valves 28, 29 mounted thereon, whereby smooth refueling is secured.

What is claimed is:

1. A fuel tank for an automotive vehicle, comprising:
a tank body for storing fuel;
a filler pipe connected to the tank body; and
a fuel outlet port device located within said tank body and connected to an end of said filler pipe, said fuel outlet port device having an upwardly facing fuel outlet opening from which fuel supplied through said filler pipe flows out into said tank body wherein said upwardly facing fuel outlet opening has an area which is at least larger than a cross-sectional area of said filler pipe, said fuel tank further comprising a fuel trap for storing part of said fuel supplied through said filler pipe to thereby prevent evaporative fuel generated within said tank body from flowing into said filler pipe.

2. A fuel tank according to claim 1, wherein said fuel outlet port device is located within said tank body at an upper portion thereof.

3. A fuel tank according to claim 1, wherein said fuel trap has a bottom wall formed with a small drain hole extending therethrough.

4. A fuel tank according to claim 1, including a check valve provided on said end of said filler pipe connected to said fuel outlet port device, for preventing fuel within said tank body from flowing back into said filler pipe.

5. A fuel tank according to claim 1, wherein a bottom wall of said fuel outlet port device is generally so gently curved as not to offer significant flow resistance to fuel supplied.

6. In an evaporative emission control system including a fuel tank, a canister for adsorbing evaporative fuel generated within said fuel tank to temporarily store said evaporative fuel, and at least one evaporative fuel-guiding passage for guiding said evaporative fuel generated within said fuel tank to said canister,
the improvement wherein said fuel tank comprises:
a tank body for storing fuel;
a filler pipe connected to said tank body; and
a fuel outlet port device located within said tank body and connected to an end of said filler pipe, said fuel outlet port device having an upwardly facing fuel outlet opening, wherein said upwardly facing fuel outlet opening has an area which is at least larger than a cross-sectional area of said filler pipe, and said fuel tank further comprising a fuel trap for storing part of said fuel supplied through said filler pipe to thereby prevent evaporative fuel generated within said tank body from flowing into said filler pipe.

7. An evaporative emission control system according to claim 6, wherein said fuel outlet port device is located within said tank body at an upper portion thereof.

8. An evaporative emission control system according to claim 6, wherein said fuel trap has a bottom wall formed with a small drain hole extending therethrough.

9. An evaporative emission control system according to claim 6, including a check valve provided on said end of said filler pipe connected to said fuel outlet port device, for preventing fuel within said tank body from flowing back into said filler pipe.

10. An evaporative emission control system according to claim 6, including:
a communication passage communicating between said at least one evaporative fuel-guiding passage and said filler pipe; and
a one-way valve arranged in said communication passage, said one-way valve being operable to open when pressure within said tank body becomes higher than pressure within said filler pipe by a predetermined amount, for permitting said evaporative fuel generated within said tank body to be introduced into said filler pipe.

11. In a fuel tank for an automotive vehicle, including an evaporative emission control system having a canister for adsorbing evaporative fuel generated within said fuel tank to temporarily store said evaporative fuel, and at least one evaporative fuel-guiding passage for guiding said evaporative fuel generated within said fuel tank to said canister,
said fuel tank including:
a tank body for storing fuel, said at least one evaporative fuel-guiding passage being connected to said tank body;
a float valve mounted at an end of said at least one evaporative fuel-guiding passage opening into said tank body, said float valve being located within said tank body at an upper portion thereof;
a filler pipe connected to said tank body; and
a fuel outlet port device located within said tank body and connected to said filler pipe, said fuel outlet port device having a fuel outlet opening from which fuel supplied via said filler pipe flows into said tank body; and
a fuel trap for storing part of said fuel supplied through said filler pipe to thereby prevent evaporative fuel generated within said tank body from flowing into said filler pipe,
the improvement wherein said fuel outlet opening of said fuel outlet port device faces in a direction deviating from said float valve.

12. A fuel tank according to claim 11, wherein said fuel outlet port device has an axis thereof laterally deviating from an imaginary vertical plane extending through an axis of said float valve and being parallel to an axis of said tank body, whereby said fuel outlet opening faces obliquely upward in a direction deviating from said float valve.

13. A fuel tank according to claim 11, wherein said fuel outlet opening faces upward, said fuel outlet port device having an axis thereof horizontally laterally deviating from an imaginary vertical plane extending through an axis of said float valve and being parallel to an axis of said tank body, whereby said fuel outlet opening faces in a direction laterally deviating from said float valve.

14. A fuel tank according to claim 11, wherein said fuel outlet port device has a symmetry plane thereof extending along a longitudinal axis thereof, said symmetry plane being circumferentially inclined relative to an imaginary vertical plane extending through an axis of said float valve and being parallel to an axis of said tank body, whereby said fuel outlet opening faces obliquely upward in a direction deviating from said float valve.

15. A fuel tank according to claim 11, wherein said fuel outlet opening of said fuel outlet port device has an end face inclined in a direction away from said float valve.

16. A fuel tank according to claim 11, wherein said fuel outlet opening of said fuel outlet port device has a flow-out guide projecting in a direction away from said float valve.

17. A fuel tank according to claim 11, wherein said fuel outlet opening of said fuel outlet port device has an area which is at least larger than a cross-sectional area of said filler pipe.

18. In a fuel tank for an automotive vehicle including an evaporative emission control system having a canister for adsorbing evaporative fuel generated within said fuel tank to temporarily store said evaporative fuel, and at least one evaporative fuel-guiding passage for guiding said evaporative fuel generated within said fuel tank to said canister, said fuel tank including:

a tank body for storing fuel, said tank body having a ceiling wall through which said at least one evaporative fuel-guiding passage is connected to said tank body;

a float valve mounted at an end of said at least one evaporative fuel-guiding passage opening into said tank body, said float valve being located within said tank body at an upper portion thereof;

a filler pipe connected to said tank body; and a fuel outlet port device located within said tank body and connected to said filler pipe, said fuel outlet port device having a fuel outlet opening from which fuel supplied via said filler pipe flows into said tank body; and a fuel trap for storing part of said fuel supplied through said filler pipe to thereby prevent evaporative fuel generated within said tank body from flowing into said filler pipe, the improvement comprising a shield member fixed to an inner surface of said ceiling wall of said tank body at a location between said fuel outlet port device and said float valve.

* * * * *